United States Patent
Morita et al.

(10) Patent No.: US 9,763,227 B2
(45) Date of Patent: Sep. 12, 2017

(54) MOBILE COMMUNICATION SYSTEM AND MOBILE COMMUNICATION METHOD

(71) Applicant: KYOCERA CORPORATION, Kyoto (JP)

(72) Inventors: Kugo Morita, Yokohama (JP); Masato Fujishiro, Yokohama (JP); Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 177 days.

(21) Appl. No.: 14/408,659

(22) PCT Filed: Jun. 27, 2013

(86) PCT No.: PCT/JP2013/067598
§ 371 (c)(1),
(2) Date: Dec. 17, 2014

(87) PCT Pub. No.: WO2014/003090
PCT Pub. Date: Jan. 3, 2014

(65) Prior Publication Data
US 2015/0181584 A1    Jun. 25, 2015

Related U.S. Application Data

(60) Provisional application No. 61/664,939, filed on Jun. 27, 2012.

(51) Int. Cl.
*H04W 72/04* (2009.01)
*H04W 76/02* (2009.01)
*H04W 88/12* (2009.01)

(52) U.S. Cl.
CPC ..... *H04W 72/0406* (2013.01); *H04W 76/023* (2013.01); *H04W 72/04* (2013.01); *H04W 88/12* (2013.01)

(58) Field of Classification Search
CPC ... H04W 84/18; H04W 76/023; H04W 4/008; H04W 52/0212; H04W 76/02;
(Continued)

(56) References Cited

U.S. PATENT DOCUMENTS

2012/0020213 A1    1/2012 Horneman et al.

FOREIGN PATENT DOCUMENTS

CN    WO 2011069295 A1 *  6/2011    ........ H04W 72/0406
WO    2010/049801 A1    5/2010

OTHER PUBLICATIONS

3GPP TSG-SA WG1 #58, Seville, Spain, May 7-11, 2012, Alcatel-Lucent, S1-121087, hereinafter D1.*
(Continued)

*Primary Examiner* — George Eng
*Assistant Examiner* — Jing Gao
(74) *Attorney, Agent, or Firm* — Studebaker & Brackett PC

(57) ABSTRACT

A mobile communication system directly performs user-data communication between a plurality of radio terminals without involvement of a radio base station. The user-data communication directly performed between the plurality of radio terminals is performed by using a part of radio resources assigned to the mobile communication system. The plurality of radio terminals include a transmission-side terminal that transmits the user data and a reception-side terminal that receives the user data. The mobile communication system switches between a first assignment mode in which the transmission-side terminal or the reception-side terminal assigns a radio resource used for the user-data communication, and a second assignment mode in which the radio base station assigns the radio resource used for the user-data communication.

2 Claims, 12 Drawing Sheets

(58) Field of Classification Search
CPC ........... H04W 84/005; H04W 36/0016; H04W 4/028; H04W 72/005; H04W 72/02; H04W 72/0453; H04W 84/12; H04W 12/06; H04W 28/08; H04W 36/16
See application file for complete search history.

(56) References Cited

OTHER PUBLICATIONS

3GPP TSG-SA WG1 #58, Seville, Spain, May 7-11, 2012, Huawei, S1-121455, hereinafter D2.*
An Office Action; "Notice of Reasons for Rejection," issued by the Japanese Patent Office on Mar. 1, 2016, which corresponds to Japanese Patent Application No. 2014-522668 and is related to U.S. Appl. No. 14/408,659; with English language statement of relevance.
International Search Report; PCT/JP2013/067598; Jul. 30, 2013.
3GPP TR 22.803 V0.3.0 (May 2012); 3rd Generation Partnership Project; Technical Specification Group SA; Feasibility Study for Proximity Services (ProSe)(Release 12).
3GPP TR 22.803 V0.5.0 (Aug. 2012); 3rd Generation Partnership Project; Technical Specification Group SA; Feasibility Study for Proximity Services (ProSe)(Release 12).
Alcatel-Lucent; "FS_ProSe: ProSe Control Paths"; 3GPP TSG-SA WG1 #58 S1-121087; Seville, Spain May 7-11, 2012.
Intel et al.; "Use case: Enabling ProSe via LTE+WLAN"; 3GPP TSG-SA WG1 #58 S1-121089; Seville, Spain May 7-11, 2012.
Huawei; "Path switching granularity"; 3GPP TSG-SA WG1 #58 S1-121265; Seville, Spain May 7-11, 2012.
Huawei et al.; "Requirements to switch to optimized path"; 3GPP TSG-SA WG1 #58 S1-121455; Seville, Spain May 7-11, 2012.

* cited by examiner

FIG. 5
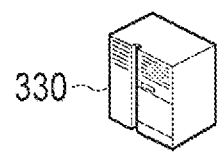
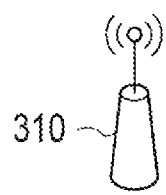
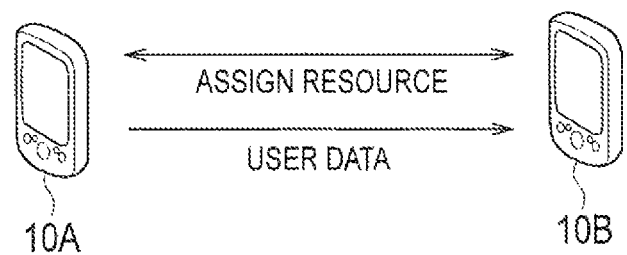

MOBILE COMMUNICATION SYSTEM AND MOBILE COMMUNICATION METHOD

TECHNICAL FIELD

The present invention relates to a mobile communication system in which user-data communication is directly performed between a plurality of radio terminals, and a mobile communication method used in the mobile communication system.

BACKGROUND ART

In recent years, there has been proposed a technology in which user-data communication (data of User-Plane) is directly performed between a plurality of radio terminals without involvement of a radio base station (D2D communication). The user-data communication directly performed between the plurality of radio terminals, is performed by using a part of radio resources assigned to a mobile communication system. However, in the D2D communication, communication of control data (data of C-Plane) is performed via the radio base station, similarly to a conventional mobile communication system.

PRIOR ART DOCUMENT

Non-Patent Document

Non-patent Document 1: 3GPP technology report "TR 22.803 V0.3.0" May, 2012

SUMMARY OF INVENTION

Meanwhile, in the D2D communication, there exists a need of considering various methods as a method for assigning a radio resource to a transmission-side terminal and a reception-side terminal.

A mobile communication system according to a first feature directly performs user-data communication between a plurality of radio terminals without involvement of a radio base station. The user-data communication directly performed between the plurality of radio terminals is performed by using a part of radio resources assigned to the mobile communication system. The plurality of radio terminals include a transmission-side terminal that transmits the user data and a reception-side terminal that receives the user data. The mobile communication system switches between a first assignment mode in which the transmission-side terminal or the reception-side terminal assigns a radio resource used for the user-data communication, and a second assignment mode in which the radio base station assigns the radio resource used for the user-data communication.

A mobile communication method according to a second feature is used in a mobile communication system in which user-data communication is directly performed between a plurality of radio terminals without involvement of a radio base station. The user-data communication directly performed between the plurality of radio terminals is performed by using a part of radio resources assigned to the mobile communication system. The plurality of radio terminals include a transmission-side terminal that transmits the user data and a reception-side terminal that receives the user data. The mobile communication method comprises: a step of switching between a first assignment mode in which the transmission-side terminal assigns a radio resource used for the user-data communication, and a second assignment mode in which the radio base station assigns the radio resource used for the user-data communication.

BRIEF DESCRIPTION OF DRAWINGS

FIG. 5 is a diagram for explaining the first assignment mode according to the first embodiment.

DESCRIPTION OF EMBODIMENTS

Figure 1:
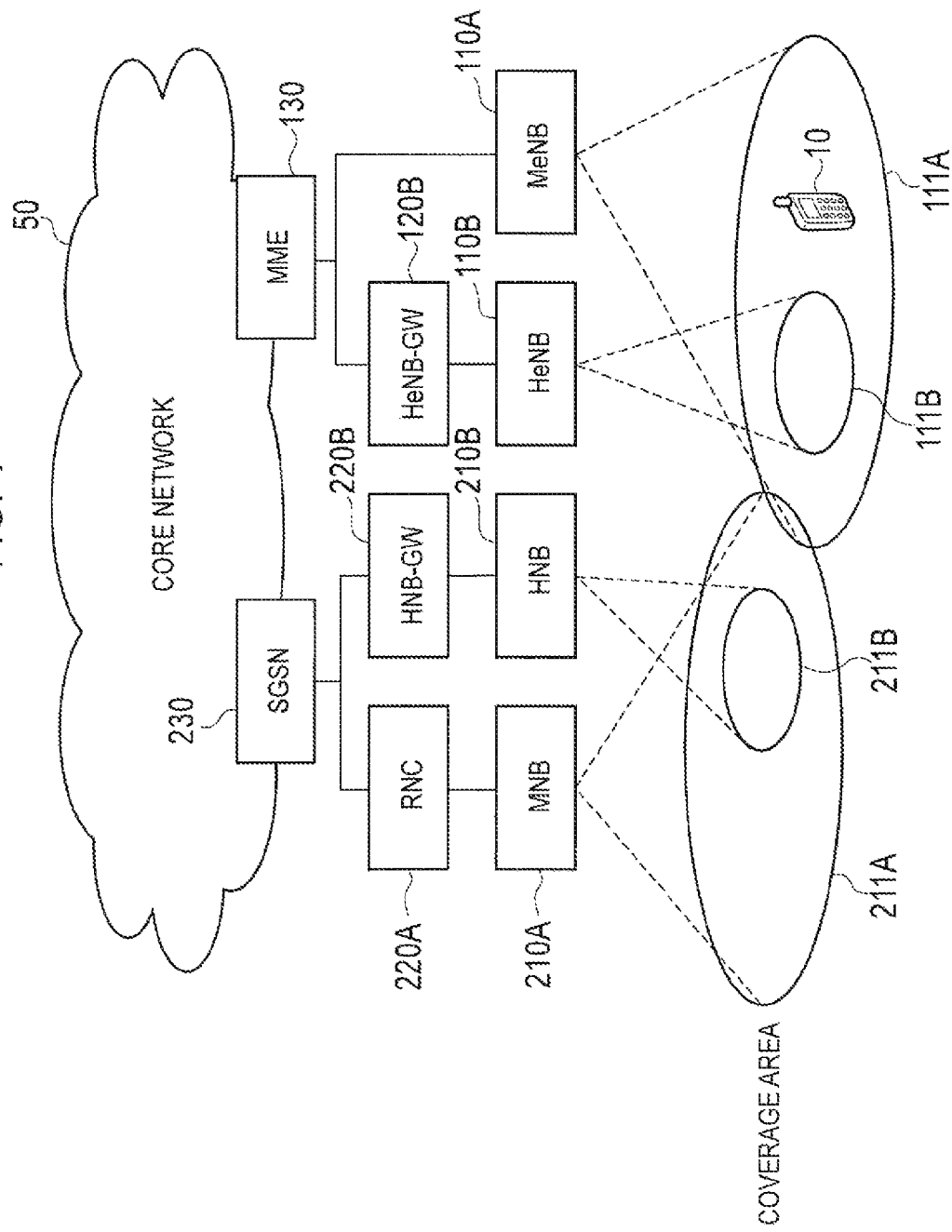
FIG. 1 is a diagram illustrating a mobile communication system 100 according to the first embodiment.

Hereinafter, a mobile communication system according to an embodiment of the present invention will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

SUMMARY OF THE EMBODIMENT

A mobile communication system according to the embodiment directly performs user-data communication between a plurality of radio terminals without involvement of a radio base station. The user-data communication directly performed between the plurality of radio terminals is performed by using a part of radio resources assigned to the mobile communication system. The plurality of radio terminals include a transmission-side terminal that transmits the user data and a reception-side terminal that receives the user data. The mobile communication system switches between a first assignment mode in which the transmission-side terminal or the reception-side terminal assigns a radio resource used for the user-data communication, and a second assignment mode in which the radio base station assigns the radio resource used for the user-data communication.

In the embodiment, the mobile communication system switches between a first assignment mode in which the transmission-side terminal or the reception-side terminal assigns a radio resource used for the user-data communication, and a second assignment mode in which the radio base station assigns the radio resource used for the user-data communication. Accordingly, the radio resource can be appropriately assigned to the transmission-side terminal and the reception-side terminal.

Here, the communication directly performed between the plurality of radio terminals without involvement of the radio base station may be called D2D communication. The D2D communication is performed by using a part (a D2D radio resource) of the radio resources assigned to the mobile communication system. As the D2D radio resource, for example, a part of uplink radio resources is used.

Furthermore, a radio resource used in the user-data communication in the D2D communication may be assigned by a radio base station or a radio terminal (a transmission-side terminal or a reception-side terminal).

Furthermore, in the first embodiment, the first assignment mode and the second assignment mode are switched on the basis of a communication state of the user data directly performed between the plurality of radio terminals.

Furthermore, in the first embodiment, when the communication state of the user data directly performed between the plurality of radio terminals is deteriorated, an assignment mode is switched from the first assignment mode to the second assignment mode.

Furthermore, in the first embodiment, when the communication state of the user data directly performed between the plurality of radio terminals is improved, an assignment mode is switched from the second assignment mode to the first assignment mode.

Furthermore, in the first embodiment, the radio base station comprises: a base station-side reception unit that receives a D2D control signal for controlling direct user-data communication, from the transmission-side terminal or the reception-side terminal; and a base station-side control unit that controls the switching between the first assignment mode and the second assignment mode on the basis of the D2D control signal.

Furthermore, in the first embodiment, the D2D control signal indicates at least one of: transmission power used for the user-data communication; and a modulation coding scheme used for the user-data communication.

Furthermore, in the first embodiment, the D2D control signal indicates at least one of: a signal for requesting the switching between the first assignment mode and the second assignment mode; a signal indicating that transmission power used for the user-data communication has exceeded a threshold value; a signal indicating that the transmission power used for the user-data communication has been below a threshold value; a signal indicating that a modulation coding scheme used for the user-data communication has been below a threshold value; and a signal indicating that the modulation coding scheme used for the user-data communication has exceeded a threshold value.

Furthermore, in the first embodiment, the D2D control signal indicates at least one of: a signal indicating a block error rate related to the user-data communication; a signal indicating a packet error rate related to the user-data communication; a signal indicating CQI related to the user-data communication; and a signal indicating a processing load of the radio terminal.

Furthermore, in the first embodiment, the D2D control signal indicates at least one of: a signal indicating that a block error rate related to the user-data communication exceeds a threshold value; a signal indicating that the block error rate related to the user-data communication is below a threshold value; a signal indicating that a packet error rate related to the user-data communication exceeds a threshold value; a signal indicating that the packet error rate related to the user-data communication is below a threshold value; a signal indicating whether predetermined QoS related to the user-data communication is satisfied; a signal indicating that CQI related to the user-data communication is below a threshold value; a signal indicating that the CQI related to the user-data communication exceeds a threshold value; a signal indicating that a processing load of the radio terminal exceeds a threshold value; and a signal indicating that the processing load of the radio terminal is below a threshold value.

Furthermore, in the second embodiment, when the radio base station determines that a reception strength of an interference signal from the transmission-side terminal exceeds a threshold, the mobile communication system switches from the first assignment mode to the second assignment mode.

Furthermore, in the third embodiment, when a number of radio terminals performing a communication of the user data by the second assignment mode exceeds a threshold, the mobile communication system switches from the second assignment mode to the first assignment mode.

Furthermore, a mobile communication method according to embodiments are used in a mobile communication system in which user-data communication is directly performed between a plurality of radio terminals without involvement of a radio base station. The user-data communication directly performed between the plurality of radio terminals is performed by using a part of radio resources assigned to the mobile communication system. The plurality of radio terminals include a transmission-side terminal that transmits the user data and a reception-side terminal that receives the user data. The mobile communication method comprises: a step of switching between a first assignment mode in which the transmission-side terminal assigns a radio resource used for the user-data communication, and a second assignment mode in which the radio base station assigns the radio resource used for the user-data communication.

First Embodiment (Mobile Communication System)

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 100 (hereinafter, UE 10) and a core network 50. Furthermore, the mobile communication system 100 includes a first communication system and a second communication system.

The first communication system, for example, is a communication system corresponding to LTE (Long Term Evolution). The first communication system, for example, includes a base station 110A (hereinafter, MeNB 110A), a home base station 110B (hereinafter, HeNB 110B), a home base station gateway 120B (hereinafter, HeNB-GW 120B), and MME 130.

A radio access network (E-UTRAN; Evolved Universal Terrestrial Radio Access Network) corresponding to the first communication system is configured from the MeNB 110A, the HeNB 110B, and the HeNB-GW 120B.

The second communication system, for example, is a communication system corresponding to UMTS (Universal Mobile Telecommunication System). The second communication system includes a base station 210A (hereinafter, MNB 210A), a home base station 210B (hereinafter, HNB 210B), RNC 220A, a home base station gateway 220B (hereinafter, HNB-GW 220B), and SGSN 230.

A radio access network (UTRAN; Universal Terrestrial Radio Access Network) corresponding to the second communication system is configured from the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) configured to perform radio communication with the UE 10 being present in the general cell 111A.

The HeNB 110B, which manages a specific cell 111B, is a device (Home evolved NodeB) configured to perform radio communication with the UE 10 being present in the specific cell 111B.

The HeNB-GW 120B, which is connected to the HeNB 110B, is a device (Home evolved NodeB Gateway) configured to manage the HeNB 110B.

The MME 130, which is connected to the MeNB 110A, is a device (Mobility Management Entity) configured to manage the mobility of the UE 10 having set up a radio connection with the MeNB 110A. Furthermore, the MME 130, which is connected to the HeNB 110B via the HeNB-GW 120B, is a device configured to manage the mobility of the UE 10 having set up a radio connection with the HeNB 110B.

The MNB 210A, which manages a general cell 211A, is a device (NodeB) configured to perform radio communication with the UE 10 being present in the general cell 211A.

The HNB 210B, which manages a specific cell 211B, is a device (Home NodeB) configured to perform radio communication with the UE 10 being present in the specific cell 211B.

The RNC 220A, which is connected to the MNB 210A, is a device (Radio Network Controller) configured to set up a radio connection (RRC Connection) with the UE 10 being present in the general cell 211A.

The HNB-GW 220B, which is connected to the HNB 210B, is a device (Home NodeB Gateway) configured to set up a radio connection (RRC Connection) with the UE 10 being present in the specific cell 211B.

The SGSN 230 is a device (Serving GPRS Support Node) configured to perform packet switching in a packet switching domain. The SGSN 230 is provided in the core network 50. Although not illustrated in FIG. 1, a device (MSC; Mobile Switching Center) configured to perform circuit switching in a circuit switching domain may be provided in the core network 50.

Furthermore, the general cell and the specific cell must be understood as functions of performing radio communication with the UE 10. However, the general cell and the specific cell are also used as terms indicating coverage areas of cells. Also, cells such as the general cell and the specific cell are identified based on the frequency used in the cell, the spreading code, the time slot, or the like.

Here, a coverage area of the general cell is larger than a coverage area of the specific cell. The general cell, for example, includes a macro cell provided by a communication provider. The specific cell, for example, includes a femto cell or a home cell provided by the third party other than the communication provider. The specific cell may include a CSG (Closed Subscriber Group) cell or a pico cell provided by the communication provider.

Hereinafter, the first communication system will be mainly described. The following description may also be applied to the second communication system.

In the first communication system, OFDMA (Orthogonal Frequency Division Multiple Access) scheme is used as a downlink multiple scheme, and SC-FDMA (Single-Carrier Frequency Division Multiple Access) scheme is used as an uplink multiple scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is a channel used to transfer a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying a recommended modulation method and an encoding rate to be used in downlink transmission. The PMI is a signal indicating a precoder matrix which is preferably used in downlink transmission. The RI is a signal indicating the number of layers (the number of streams) to be used in downlink transmission. The SR is a signal for requesting the assignment of an uplink radio resource (a resource block which will be described later). The ACK/NACK is a signal indicating whether a signal transmitted via the downlink channel (for example, the PDSCH) has been successfully received.

The uplink shared channel is a channel used to transfer a control signal (including the above-mentioned control signal) and/or a data signal. For example, the uplink radio resource may be assigned only to the data signal, or assigned such that the data signal and the control signal are multiplexed.

The downlink control channel is a channel used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted via the uplink channel.

The downlink shared channel is a channel used to transfer a control signal and/or a data signal. For example, the downlink radio resource may be assigned only to the data signal, or assigned such that the data signal and the control signal are multiplexed.

In addition, a control signal transmitted via the downlink shared channel includes TA (Timing Advance). The TA is transmission timing correction information between the UE 10 and the MeNB 110A, and is measured by the MeNB 110A based on an uplink signal transmitted from the UE 10.

Furthermore, a control signal transmitted via a channel, other than the downlink control channel (the PDCCH) and the downlink shared channel (the PDSCH), includes ACK/NACK. The ACK/NACK is a signal indicating whether a signal transmitted via the uplink channel (for example, the PUSCH) has been successfully received.

The general cell and the specific cell broadcast broadcast information via a broadcast channel (BCCH; Broadcast Control Channel). The broadcast information, for example, is information such as MIB (Master Information Block) or SIB (System Information Block).

Specifically not illustrated in FIG. 1, the first communication system may include a relay node configured to relay data communication between the MeNB 110A (or the HeNB 110B) and the UE 10. Similarly, the second communication system may include a relay node configured to relay data communication with the MNB 210A (or the HNB 210B).

(Radio Frame)

Figure 2:
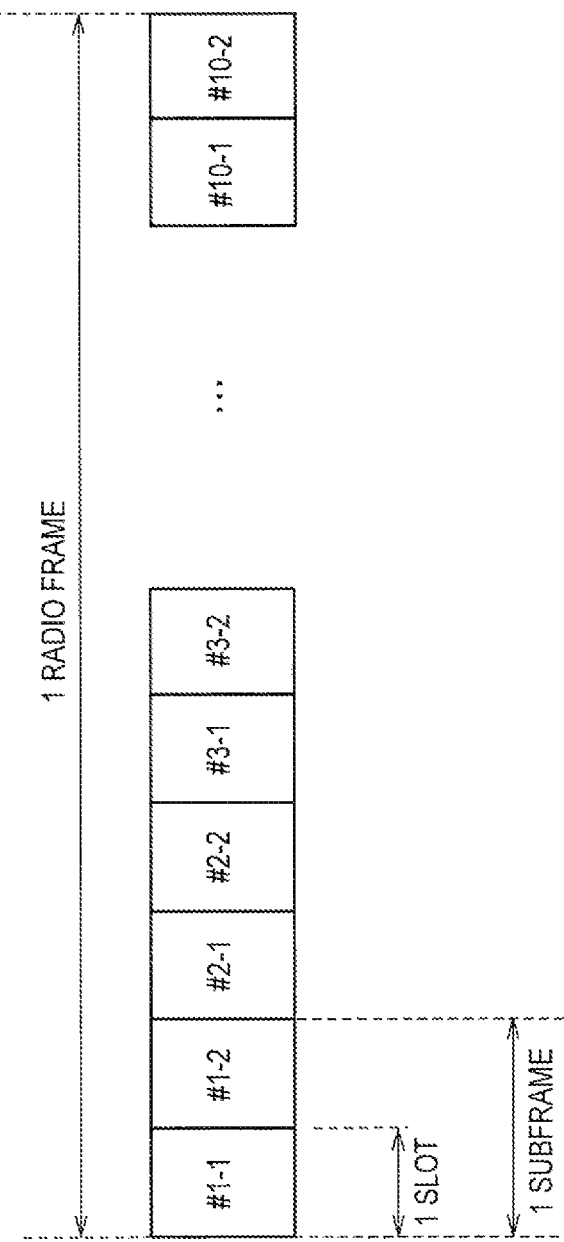
FIG. 2 is a diagram illustrating the radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in the downward direction. In the same manner, one slot is configured by a plurality of SC-FDMA symbols (for example, six SC-FDMA symbols or seven SC-FDMA symbols) in the upward direction.

(Radio Resource)

Figure 3:
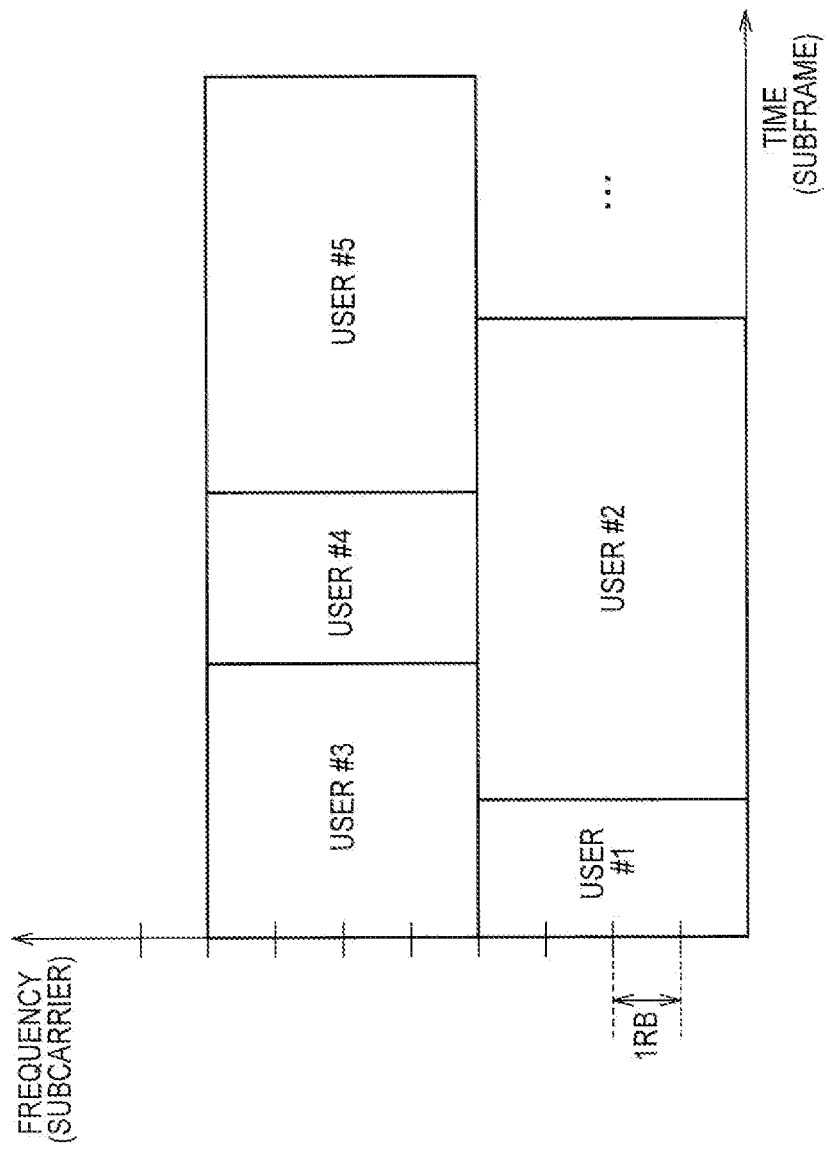
FIG. 3 is a diagram illustrating the radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the MeNB 110A. The MeNB 110A assigns the radio resource to each UE 10 based on the CQI, the PMI, the RI, and the like.

(Application Case)

Figure 4:
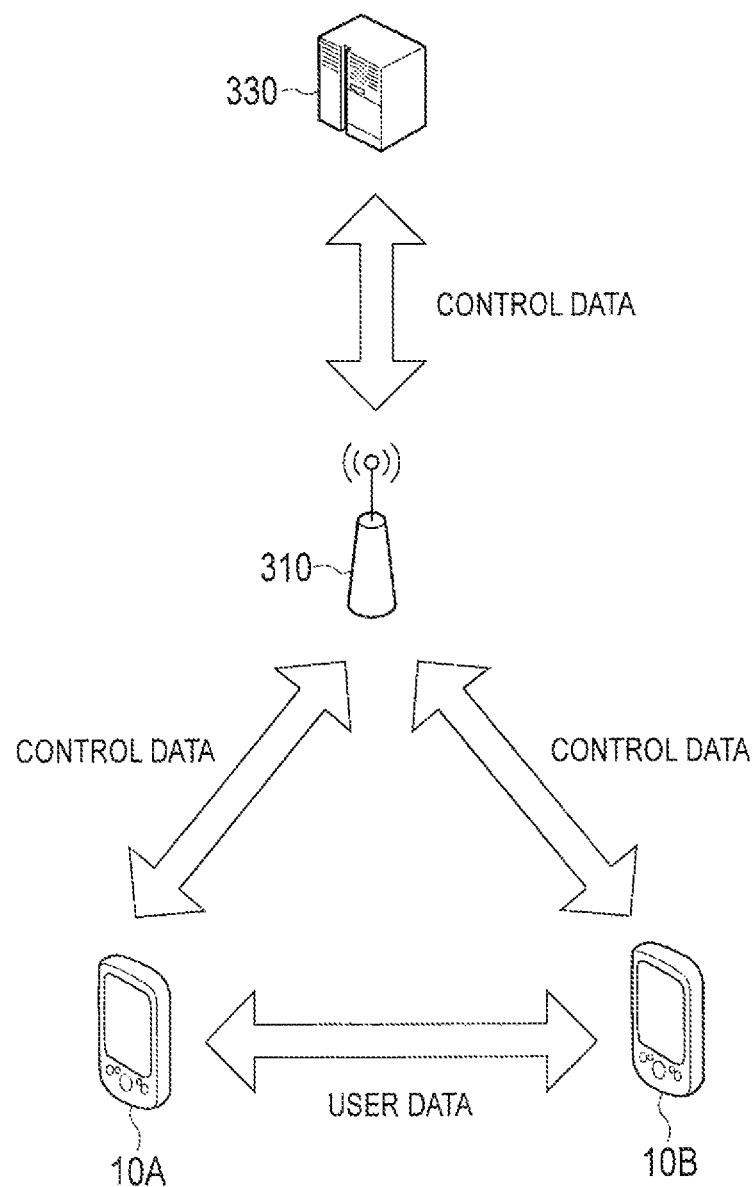
FIG. 4 is a diagram illustrating the application case according to the first embodiment.

Hereinafter, the application case according to the first embodiment will be described. FIG. 4 is a diagram for explaining the application case according to the first embodiment. In FIG. 4, as the UE 10, UE 10A and UE 10B are illustrated. It is preferable that a radio base station 310 is the MeNB 110A or the HeNB 110B. However, the radio base station 310 may be the MNB 210A or the HNB 210B. Alternatively, the radio base station 310 may be a relay node. A network device 330 is a device provided in the core network 50. The network device 330 may be the MME 130 or the SGSN 230.

As illustrated in FIG. 4, the communication of user data (data of User-Plane) is directly performed between a plurality of radio terminals without involvement of a radio base station (hereinafter, D2D communication). Meanwhile, communication of control data (data of C-Plane) is performed via the radio base station, similarly to that in a conventional mobile communication system.

Furthermore, the D2D communication is performed by using a part (hereinafter, a D2D radio resource) of radio resources assigned to the mobile communication system. As the D2D radio resource, for example, a part of uplink radio resources is used. A radio resource used in the user-data communication in the D2D communication may be assigned by a radio base station or a radio terminal (a transmission-side terminal or a reception-side terminal).

For example, it is preferable that the D2D radio resource is broadcasted from each cell managed by the radio base station. The D2D radio resource, for example, is included in MIB (Master Information Block) or SIB (System Information Block).

(First Assignment Mode)

Hereinafter, the first assignment mode according to the first embodiment will be described. FIG. 5 is a diagram for explaining the first assignment mode according to the first embodiment. In FIG. 5, as the UE 10, the UE 10A and the UE 10B are illustrated. The UE 10A is an example of a transmission-side terminal and the UE 10B is an example of a reception-side terminal.

As illustrated in FIG. 5, in the first assignment mode, the UE 10 (the UE 10A or the UE 10B) assigns the radio resource used for the user-data communication in the D2D communication. Specifically, the UE 10 (the UE 10A or the UE 10B) autonomously assigns the radio resource used for the user-data communication in the D2D communication from among D2D radio resources broadcasted from each cell managed by the radio base station 310. The UE 10 notifies another UE 10 of the assigned radio resource (resource assignment).

The UE 10A transmits user data to the UE 10B by using the assigned radio resource. Similarly, the UE 10B receives the user data from the UE 10A by using the assigned radio resource.

(Second Assignment Mode)

Figure 6:
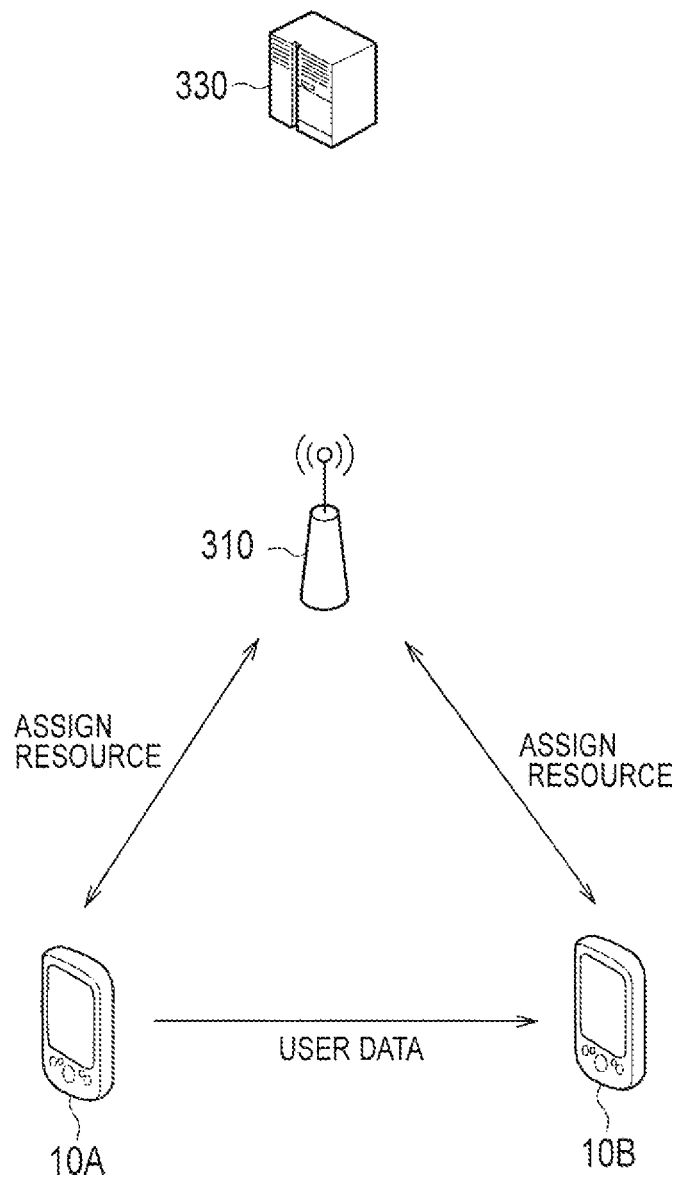
FIG. 6 is a diagram for explaining the second assignment mode according to the first embodiment.

Hereinafter, the second assignment mode according to the first embodiment will be described. FIG. 6 is a diagram for explaining the second assignment mode according to the first embodiment. In FIG. 6, as the UE 10, the UE 10A and the UE 10B are illustrated. The UE 10A is an example of a transmission-side terminal and the UE 10B is an example of a reception-side terminal.

As illustrated in FIG. 6, in the second assignment mode, the radio base station 310 assigns the radio resource used for the user-data communication in the D2D communication. Specifically, the radio base station 310 assigns, to the UE 10A and the UE 10B, the radio resource used for the user-data communication in the D2D communication from among D2D radio resources. The radio base station 310 notifies the UE 10A and the UE 10B of the assigned radio resource (resource assignment).

The UE 10A transmits user data to the UE 10B by using the assigned radio resource. Similarly, the UE 10B receives the user data from the UE 10A by using the assigned radio resource.

(Transmission-Side Terminal)

Figure 7:
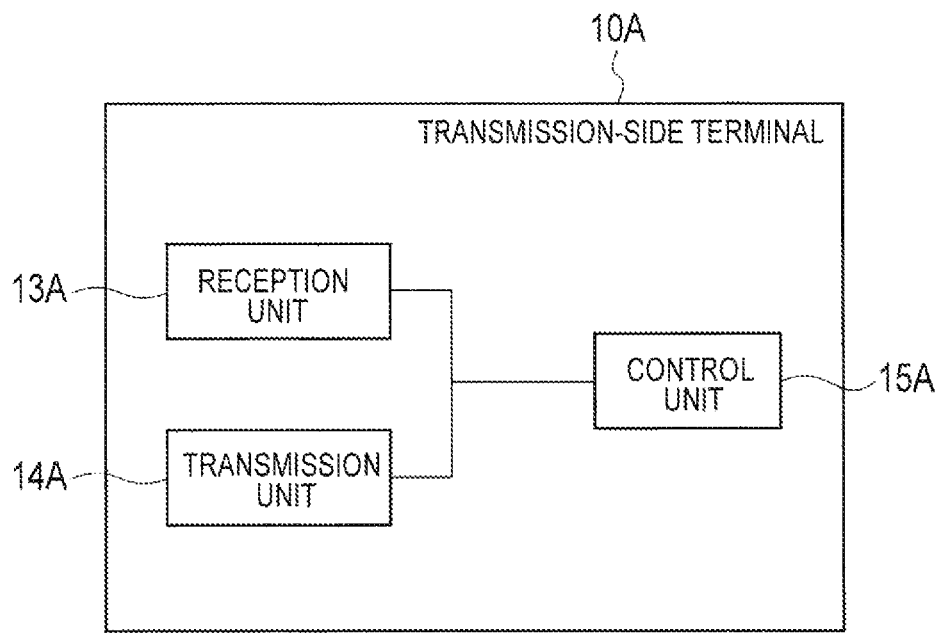
FIG. 7 is a diagram illustrating the UE 10A (transmission-side terminal) according to the first embodiment.

Hereinafter, the transmission-side terminal according to the first embodiment will be described. Furthermore, as the transmission-side terminal, the UE 10A is illustrated. FIG. 7 is a block diagram illustrating the UE 10A according to the first embodiment.

As illustrated in FIG. 7, the UE 10A includes a reception unit 13A, a transmission unit 14A, and a control unit 15A.

The reception unit 13A receives data from the radio base station 310 in communication performed between the radio base station 310 (cellular communication). The reception unit 13A receives data from the UE 10B in the D2D communication. For example, in the D2D communication, the reception unit 13A may receive, from the UE 10B, a transmission acknowledgement signal (ACK/NACK) indicating whether it is possible to receive user data. As described above, the reception unit 13A may receive the transmission acknowledgement signal via the radio base station 310 in the D2D communication.

The transmission unit 14A transmits data to the radio base station 310 in the cellular communication. The transmission unit 14A transmits data to the UE 10B in the D2D communication. For example, the transmission unit 14A transmits user data to the UE 10B in the D2D communication. Furthermore, the transmission unit 14A retransmits the user data to the UE 10B in response to an instruction output from the control unit 15A.

In the first embodiment, the transmission unit 14A may transmit a D2D control signal for controlling direct user-data communication to the radio base station 310.

The D2D control signal, for example, indicates at least one of: a signal for requesting the switching between the first assignment mode and the second assignment mode; a signal indicating that transmission power used for the user-data communication has exceeded a threshold value; a signal indicating that the transmission power used for the user-data communication has been below a threshold value; a signal indicating that a modulation coding scheme used for the user-data communication has been below a threshold value; and a signal indicating that the modulation coding scheme used for the user-data communication has exceeded a threshold value.

The control unit 15A controls the UE 10A. Specifically, the control unit 15A determines a change in the communication state of the user data directly performed between the UE 10A and the UE 10B.

Here, the case in which it is determined that the communication state is improved is the case in which the transmission power used for the user-data communication has been below a threshold value or the modulation coding scheme used for the user-data communication has exceeded a threshold value. Alternatively, the case in which it is determined that the communication state is improved may be the case in which a block error rate has been below a threshold value, the case in which a packet error rate has been below a threshold value, the case in which predetermined QoS has been satisfied, the case in which CQI has exceeded a threshold value, and the case in which a processing load of the UE 10A has been below a threshold value.

Furthermore, the case in which it is determined that the communication state is deteriorated is the case in which the transmission power used for the user-data communication has exceeded a threshold value or the modulation coding scheme used for the user-data communication has been below a threshold value. Alternatively, the case in which it is determined that the communication state is deteriorated may be the case in which the block error rate has exceeded a threshold value, the case in which the packet error rate has exceeded a threshold value, the case in which the predetermined QoS has not been satisfied, the case in which the CQI has been below a threshold value, and the case in which the processing load of the UE 10A has exceeded a threshold value.

Furthermore, when it is determined that the communication state is deteriorated, the control unit 15A instructs the transmission unit 14A to transmit the D2D control signal. When it is determined that the communication state is improved, the control unit 15A instructs the transmission unit 14A to transmit the D2D control signal.

In the first embodiment, when it is determined that the communication state is deteriorated, the assignment mode is switched from the first assignment mode to the second assignment mode by the transmission of the D2D control signal. Meanwhile, when it is determined that the communication state is improved, the assignment mode is switched from the second assignment mode to the first assignment mode by the transmission of the D2D control signal.

(Reception-Side Terminal)

Figure 8:
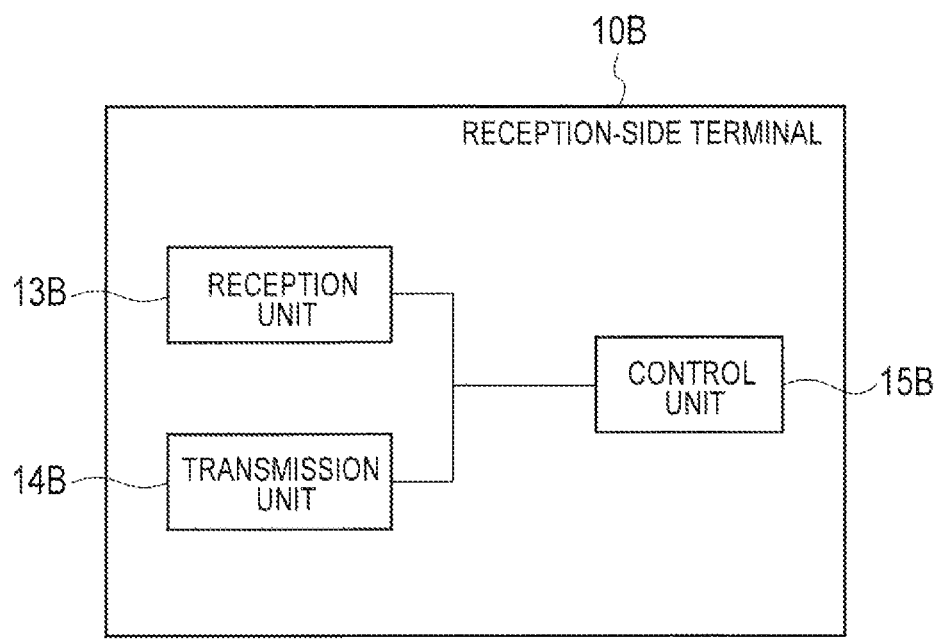
FIG. 8 is a diagram illustrating the UE 10B (reception-side terminal) according to the first embodiment.

Hereinafter, the reception-side terminal according to the first embodiment will be described. Furthermore, as the reception-side terminal, the UE 10B is illustrated. FIG. 8 is a block diagram illustrating the UE 10B according to the first embodiment.

As illustrated in FIG. 8, the UE 10B includes a reception unit 13B, a transmission unit 14B, and a control unit 15B.

The reception unit 13B receives data from the radio base station 310 in the cellular communication. The reception unit 13B receives data from the UE 10A in the D2D communication. For example, in the D2D communication, the reception unit 13B receives user data (initial transmission) transmitted from the UE 10A. Furthermore, the transmission unit 14A receives user data (retransmission) retransmitted from the UE 10A.

The transmission unit 14B transmits data to the radio base station 310 in the cellular communication. The transmission unit 14A transmits data to the UE 10A in the D2D communication. For example, the transmission unit 14B may transmit, to the UE 10A, a transmission acknowledgement signal (ACK/NACK) indicating whether it is possible to receive user data. The transmission unit 14B may transmit the transmission acknowledgement signal (ACK/NACK) to the radio base station 310 in the D2D communication.

In the first embodiment, the transmission unit 14B may transmit the D2D control signal for controlling the direct user-data communication to the radio base station 310. Furthermore, it is sufficient if the D2D control signal is transmitted to the radio base station 310 from at least one of the UE 10A and the UE 10B.

The control unit 15B controls the UE 10B. For example, similarly to the control unit 15A, the control unit 15B determines a change in the communication state of the user data directly performed between the UE 10A and the UE 10B. Similarly to the control unit 15A, when it is determined that the communication state is deteriorated, the control unit 15B instructs the transmission unit 14B to transmit the D2D control signal. Alternatively, similarly to the control unit 15A, when it is determined that the communication state is improved, the control unit 15B instructs the transmission unit 14B to transmit the D2D control signal.

As described above, when it is determined that the communication state is deteriorated, the assignment mode is switched from the first assignment mode to the second assignment mode by the transmission of the D2D control signal. Meanwhile, when it is determined that the communication state is improved, the assignment mode is switched from the second assignment mode to the first assignment mode by the transmission of the D2D control signal.

(Radio Base Station)

Figure 9:
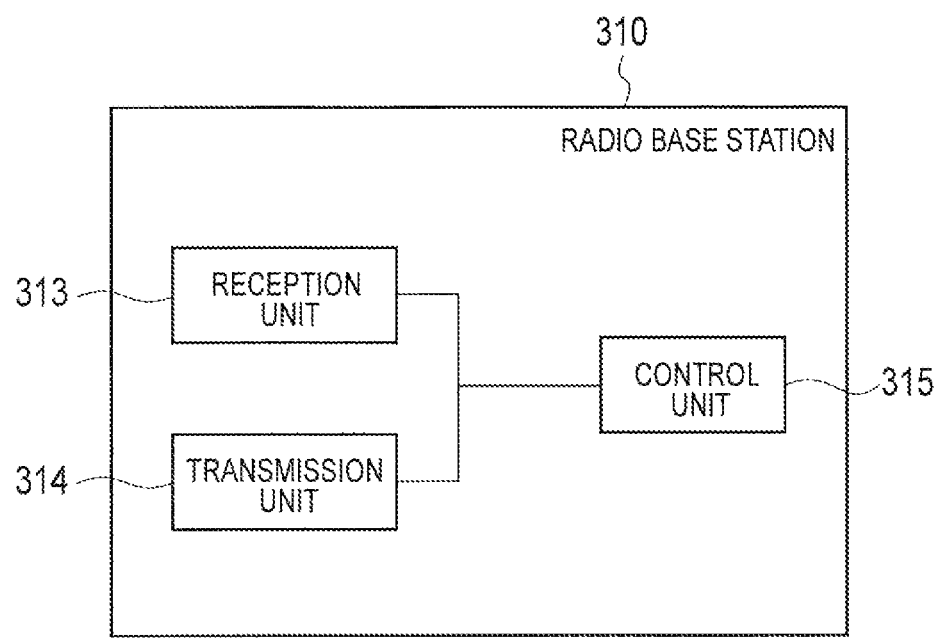
FIG. 9 is a diagram illustrating the radio base station 310 according to the first embodiment.

Hereinafter, the radio base station according to the first embodiment will be described. FIG. 9 is a block diagram illustrating the radio base station 310 according to the first embodiment.

As illustrated in FIG. 9, the radio base station 310 includes a reception unit 313, a transmission unit 314, and a control unit 315.

The reception unit 313 receives data from the UE 10. For example, in the D2D communication, the reception unit 313 receives, from the UE 10B, a transmission acknowledgement signal (ACK/NACK) indicating whether it is possible to receive user data. Furthermore, the reception unit 313 may receive the user data transmitted from the UE 10A to the UE 10B.

In the first embodiment, the reception unit 313 receives the D2D control signal from the UE 10 (the UE 10A or the UE 10B).

The transmission unit 314 receives data from the UE 10. For example, when the transmission acknowledgement signal (ACK/NACK) is received from the UE 10B in the D2D communication, in response to the transmission acknowledgement signal (ACK/NACK), the transmission unit 314 transmits the transmission acknowledgement signal to the UE 10A. For example, the transmission unit 314 may relay the transmission acknowledgement signal, which is received from the UE 10B, to the UE 10A. Alternatively, the transmission unit 314 may transmit the transmission acknowledgement signal to the UE 10A, together with a signal for assigning a radio resource used for the user-data communication in the D2D communication to the UE 10A.

The control unit 315 controls the radio base station 310. Specifically, the control unit 315 assigns uplink and downlink radio resources to the UE 10. Furthermore, the control unit 315 may assign the radio resource, which is assigned to the user-data communication directly performed between the UE 10A and the UE 10B, as the reception resource for receiving the user data. In this way, the radio base station 310 is able to receive the user data directly communicated between the UE 10A and the UE 10B.

In the first embodiment, in response to the D2D control signal, the control unit 315 switches between the first assignment mode and the second assignment mode. For example, in response to the reception of the D2D control signal indicating that the communication state of the user data directly performed between the UE 10A and the UE 10B is deteriorated, the control unit 315 switches the assignment mode from the first assignment mode to the second assignment mode. That is, the control unit 315 assigns a radio resource for receiving the user data in the D2D communication to the UE 10A and the UE 10B.

Meanwhile, in response to the reception of the D2D control signal indicating that the communication state of the user data directly performed between the UE 10A and the UE 10B is improved, the control unit 315 switches the assignment mode from the second assignment mode to the first assignment mode. That is, the control unit 315 is not involved in assigning the radio resource for receiving the user data in the D2D communication.

(Operation of Mobile Communication System)

Figure 10:
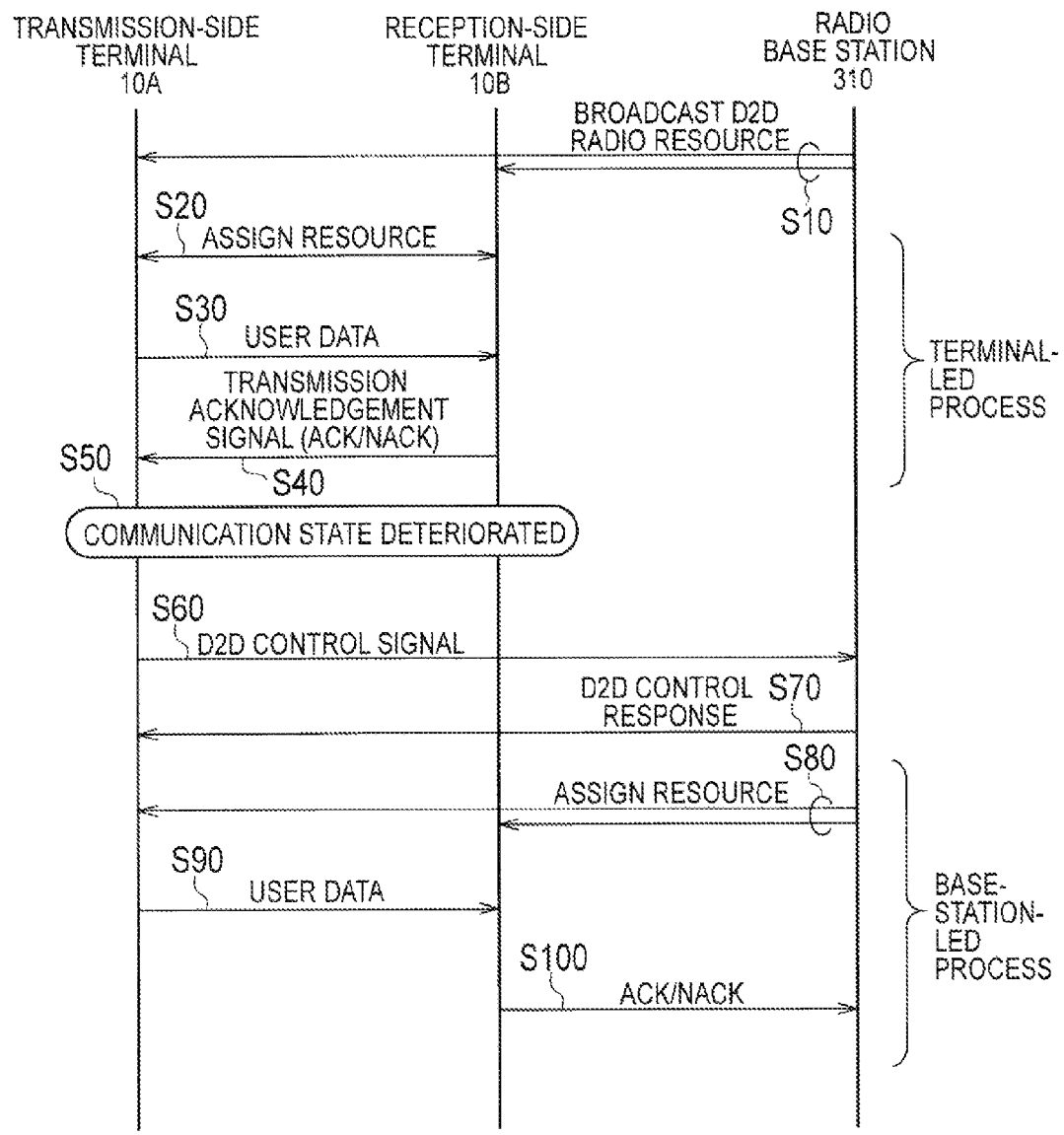
FIG. 10 is a diagram illustrating the operation of the mobile communication system 100 according to the first embodiment.
Figure 11:
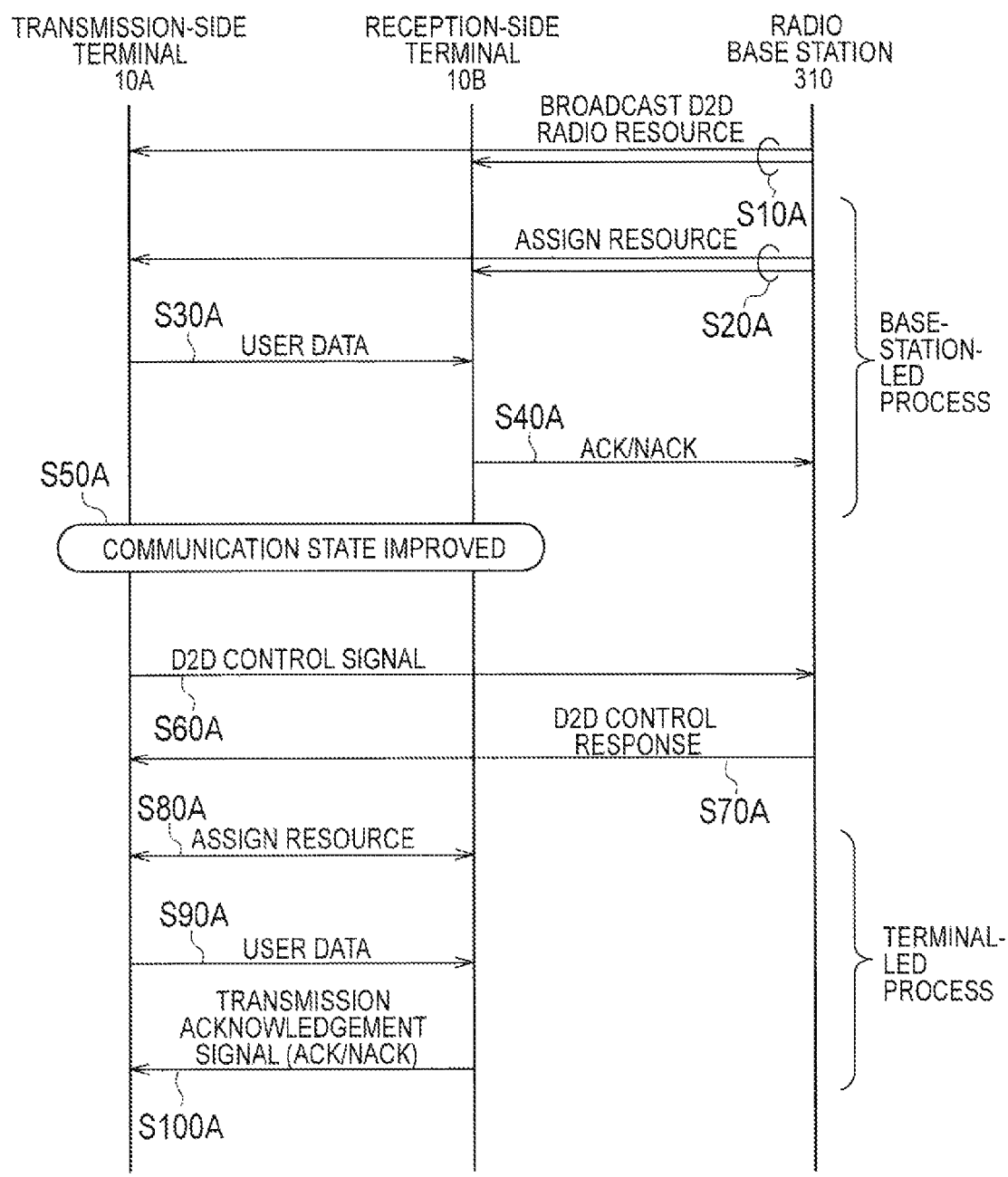
FIG. 11 is a diagram illustrating the operation of the mobile communication system 100 according to the first embodiment.

Hereinafter, the operation of the mobile communication system according to the first embodiment will be described. FIG. 10 and FIG. 11 are diagrams illustrating the operation of the mobile communication system 100 according to the first embodiment.

Firstly, with reference to FIG. 10, a description will be provided for a procedure for switching the assignment mode from the first assignment mode to the second assignment mode.

As illustrated in FIG. 10, in step 10, each cell managed by the radio base station 310 broadcasts D2D radio resources. The D2D radio resources, for example, are included in (Master Information Block) or SIB (System Information Block).

In step 20, the UE 10 (the UE 10A or the UE 10B) autonomously assigns the radio resource used for the user-data communication in the D2D communication from among the D2D radio resources. The UE 10 notifies another UE 10 of the assigned radio resource.

In step 30, the UE 10A transmits user data to the UE 10B by using the radio resource assigned in step 20. Similarly, the UE 10B receives the user data from the UE 10A by using the radio resource assigned in step 20.

In step 40, the UE 10B transmits, to the UE 10A, a transmission acknowledgement signal indicating whether the UE 10B has been able to receive the user data.

Here, it should be noted that the processes from step 20 to step 40 are terminal-led processes (the first assignment mode).

In step 50, the communication state of the user data directly performed between the UE 10A and the UE 10B is deteriorated.

In step 60, the UE 10A transmits the D2D control signal to the radio base station 310. In step 70, the radio base station 310 transmits a response (a D2D control response) for the D2D control signal, to the UE 10A.

Here, the D2D control signal indicates at least one of: a signal for requesting the switching the assignment mode to the second assignment mode from the first assignment mode; a signal indicating that the transmission power used for the user-data communication has exceeded a threshold value; and a signal indicating that the modulation coding scheme used for the user-data communication has been below a threshold value.

In addition, in step 60, the UE 10A transmits the D2D control signal. However, the embodiment is not limited thereto. Specifically, the UE 10B may transmit the D2D control signal.

In step 80, the radio base station 310 assigns, to the UE 10A and the UE 10B, the radio resource used for the user-data communication in the D2D communication from among the D2D radio resources. The radio base station 310 notifies the UE 10A and the UE 10B of the assigned radio resource.

In addition, in base-station-led processes (the second assignment mode), the radio base station 310 may assign, to the UE 10A and the UE 10B, a radio resource other than the D2D radio resource broadcasted in each cell among radio resources used for cellular communication performed between the UE 10 and the radio base station 310. In other words, the radio base station 310 may assign the radio resource, other than the D2D radio resource broadcasted in each cell, to the D2D communication.

In step 90, the UE 10A transmits user data to the UE 10B by using the radio resource assigned in step 80. Similarly, the UE 10B receives the user data from the UE 10A by using the radio resource assigned in step 80.

In step 100, the UE 10B transmits, to the radio base station 310, a transmission acknowledgement signal indicating whether the UE 10B has been able to receive the user data. When the transmission acknowledgement signal is NACK, it is preferable that the radio base station 310 assigns a radio resource necessary for the retransmission of the user data and transmits the transmission acknowledgement signal (ACK/NACK) to the UE 10A. Alternatively, when the radio base station 310 receives user data directly communicated between a plurality of UEs 10, the radio base station 310 may perform the retransmission control of the user data related to the D2D communication in response to the transmission acknowledgement signal (NACK).

Here, it should be noted that the processes from step 80 to step 100 are the base-station-led processes (the second assignment mode).

Secondly, with reference to FIG. 11, a description will be provided for a procedure for switching the assignment mode from the second assignment mode to the first assignment mode.

As illustrated in FIG. 11, in step 10A, each cell managed by the radio base station 310 broadcasts D2D radio resources. The D2D radio resources, for example, are included in (Master Information Block) or SIB (System Information Block).

In step 20A, the radio base station 310 assigns, to the UE 10A and the UE 10B, the radio resource used for the user-data communication in the D2D communication from among the D2D radio resources. The radio base station 310 notifies the UE 10A and the UE 10B of the assigned radio resource.

In addition, in the base-station-led processes (the second assignment mode), the radio base station 310 may assign, to the UE 10A and the UE 10B, a radio resource other than the D2D radio resource broadcasted in each cell among radio resources used for cellular communication performed between the UE 10 and the radio base station 310. In other words, the radio base station 310 may assign the radio resource, other than the D2D radio resource broadcasted in each cell, to the D2D communication.

In step 30A, the UE 10A transmits user data to the UE 10B by using the radio resource assigned in step 20A. Similarly, the UE 10B receives the user data from the UE 10A by using the radio resource assigned in step 20A.

In step 40A, the UE 10B transmits, to the radio base station 310, a transmission acknowledgement signal indicating whether the UE 10B has been able to receive the user data. When the transmission acknowledgement signal is NACK, it is preferable that the radio base station 310 assigns a radio resource necessary for the retransmission of the user data and transmits the transmission acknowledgement signal (ACK/NACK) to the UE 10A. Alternatively, when the radio base station 310 receives user data directly communicated between a plurality of UEs 10, the radio base station 310 may perform the retransmission control of the user data related to the D2D communication in response to the transmission acknowledgement signal (NACK).

Here, it should be noted that the processes from step 20A to step 40A are the base-station-led processes (the second assignment mode).

In step 50A, the communication state of the user data directly performed between the UE 10A and the UE 10B is improved.

In step 60A, the UE 10A transmits the D2D control signal to the radio base station 310. In step 70A, the radio base station 310 transmits a response (a D2D control response) for the D2D control signal, to the UE 10A.

In addition, in step 60A, the UE 10A transmits the D2D control signal. However, the embodiment is not limited thereto. Specifically, the UE 10B may transmit the D2D control signal.

Here, the D2D control signal indicates at least one of: a signal for requesting the switching the assignment mode to the first assignment mode from the second assignment mode; a signal indicating that the transmission power used for the user-data communication has been below a threshold value; and a signal indicating that the modulation coding scheme used for the user-data communication has exceeded a threshold value.

In step 80A, the UE 10 (the UE 10A or the UE 10B) autonomously assigns the radio resource used for the user-data communication in the D2D communication from among the D2D radio resources. The UE 10 notifies another UE 10 of the assigned radio resource.

In step 90A, the UE 10A transmits user data to the UE 10B by using the radio resource assigned in step 80A. Similarly, the UE 10B receives the user data from the UE 10A by using the radio resource assigned in step 80A.

In step 100A, the UE 10B transmits, to the UE 10A, a transmission acknowledgement signal indicating whether the UE 10B has been able to receive the user data.

Here, it should be noted that the processes from step 80A to step 100A are the terminal-led processes (the first assignment mode).

(Operation and Effect)

In the first embodiment, the mobile communication system 100 switches between the first assignment mode in which the UE 10 (the UE 10A or the UE 10B) assigns the radio resource used for the user-data communication, and the second assignment mode in which the radio base station 310 assigns the radio resource used for the user-data communication. Consequently, it is possible to appropriately assign the radio resource to the UE 10 (the UE 10A and the UE 10B).

Specifically, when the communication state of the user data directly performed between the UE 10A and the UE 10B is poor, since the second assignment mode (the base-station-led process) is applied, it is possible to assign the radio resource used for the user-data communication related to the D2D communication in consideration of interference of an entire cell. Consequently, the communication state of the user data related to the D2D communication is expected to be improved.

Meanwhile, when the communication state of the user data directly performed between the UE 10A and the UE 10B is good, since the first assignment mode (the terminal-led process) is applied, a processing load of the radio base station 310 is reduced. Furthermore, the degree of freedom of the assignment of the radio resource used for the user-data communication related to the D2D communication is increased.

Second Embodiment

Operation of Mobile Communication System

Next, the operation of a mobile communication system according to the second embodiment will be described by referring to FIG. 12. The portions different from aforementioned embodiments are mainly described, and descriptions for similar portions are omitted.

Figure 12:
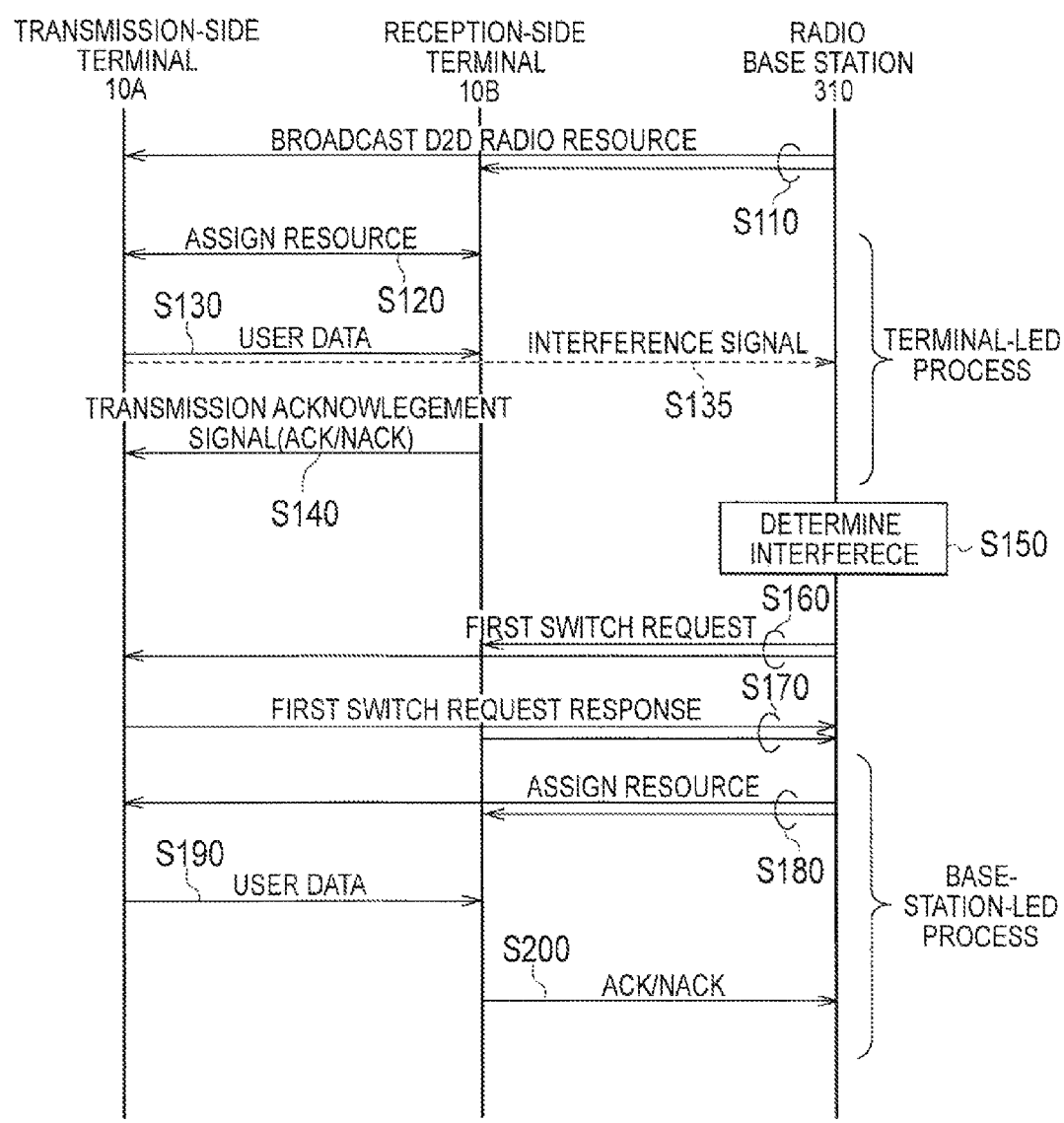
FIG. 12 is a diagram illustrating the operation of the mobile communication system 100 according to a second embodiment.

FIG. 12 is as sequence diagram illustrating the operation of mobile communication system 100 according to the second embodiment.

In the aforementioned first embodiment, the switch between the first assignment mode and the second assignment mode is performed based on the communication state of user data. However, in the present embodiment, when the radio base station 310 determines that the reception strength of the interference signal from the UE 10 performing the D2D communication exceeds a threshold, an assignment mode is switched from the first assignment mode the second assignment mode.

Step 110 to step 130 and step 140 illustrated in FIG. 12 correspond to step 10 to step 30 and step 40 of FIG. 10 of the first embodiment.

As illustrated in FIG. 12, in step 135, the radio base station 310 receives an interference signal from UE 10A by transmitting user data of UE 10A in step 130.

In step 150, the radio base station 310 determines whether the interference signal from the UE 10A exceeds a threshold. When the radio base station 310 determines that the interference signal exceeds the threshold, a process of step 160 is performed. In the present embodiment, it is assumed that the radio base station 310 determines that the interference signal from UE 10A exceeds the threshold.

In step 160, the radio base station 310 transmits first switch requests to the UE 10A and the UE 10B. The UE 10A and the UE 10B receives the first switch requests.

The first switch request is one of: a signal requesting the switch of assignment mode from the first assignment mode to the second assignment mode; and a signal indicating that the interference signal from the UE 10A exceeds the threshold.

The first switch request may be transmitted only to a UE 10 assigning radio resources in D2D communications.

In step 170, the UE 10A and the UE 10B transmits a response (first switch request response) for the first switch request to the radio base station 310.

Step 180 to step 200 correspond to step 80 to step 100 of FIG. 10 of the first embodiment.

(Operation and Effect)

In the mobile communication system 100 according to the second embodiment, when the radio base station 310 determines that the interference signal from the UE 10 A exceeds the threshold, an assignment mode is switched from the first assignment mode to the second assignment mode. Accordingly, it is possible to suppress an interference received at the radio base station 310 from UEs 10 performing D2D communications. Furthermore, it is possible to assign radio resources used for user data communications according to D2D communications by considering an interference of entire cell.

Third Embodiment

Next, the operation of a mobile communication system according to the third embodiment will be described by referring to FIG. 13. The portions different from aforementioned first and second embodiments are mainly described, and descriptions for similar portions are omitted.

Figure 13:
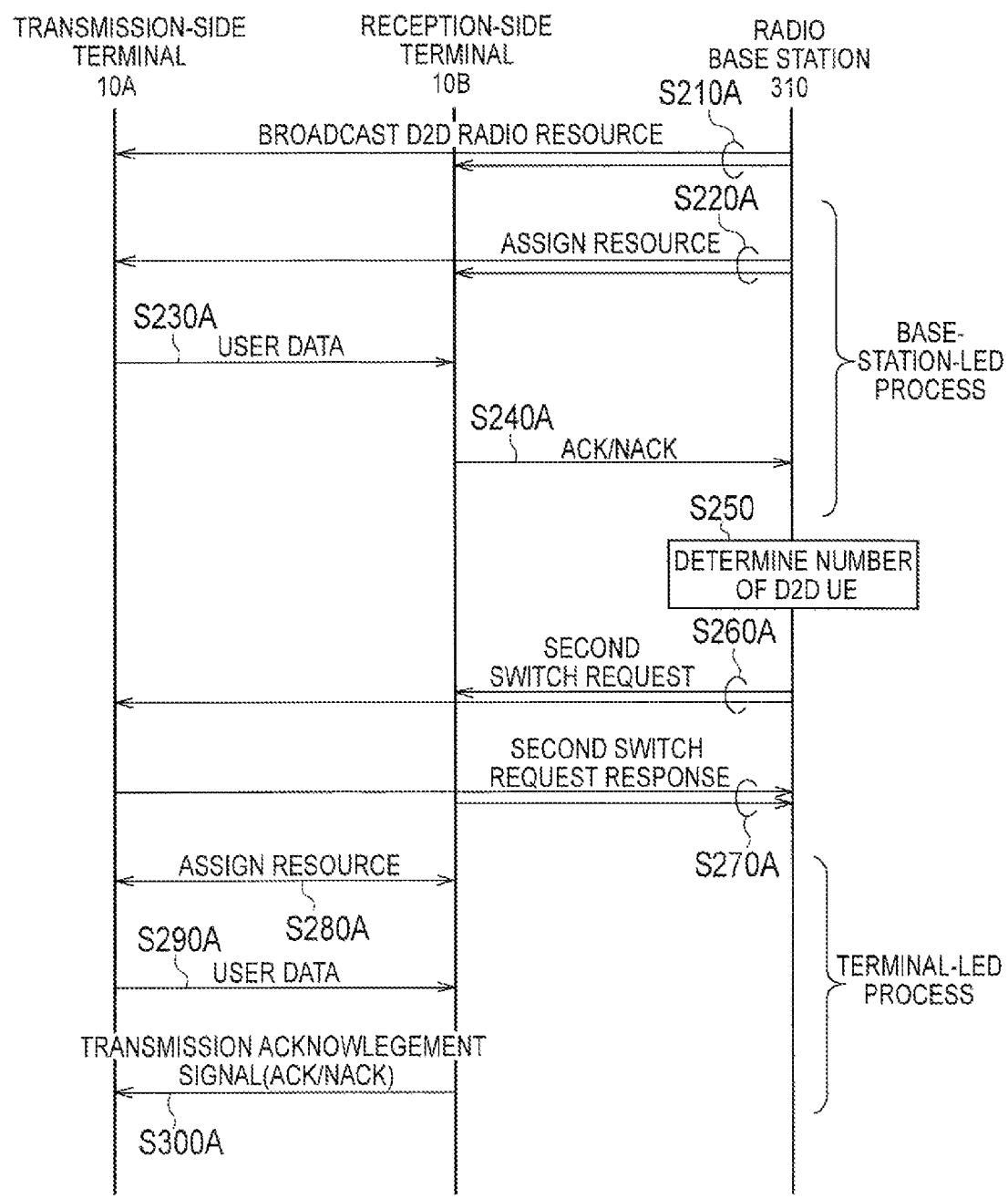
FIG. 13 is a diagram illustrating the operation of the mobile communication system 100 according to a second embodiment.

FIG. 13 is a sequence diagram illustrating the operation of the mobile communication system 100 according to the third embodiment.

In the aforementioned first embodiment, the switch between the first assignment mode and the second assignment mode is performed based on the communication state of user data. However, in the present embodiment, when the number of UEs 10 performing D2D communications exceeds a threshold, an assignment mode is switched from the second assignment mode to first assignment mode.

Step 210A to step 240A illustrated in FIG. 13 correspond to step 10A to step 40A of FIG. 11 of the first embodiment.

As illustrated in FIG. 13, in step 250, the radio base station 310 determines whether the number of UEs 10 performing D2D communications exceeds the threshold. Specifically, the radio base station 310 determines whether the number of UEs 10 performing D2D communications in a cell managed by the radio base station 310 exceeds the threshold.

When the radio base station 310 determines that the number of UEs 10 performing D2D communications exceeds the threshold, a process of step 260A is performed. The radio base station 310 may determine that the number of UEs 10 performing D2D communications exceeds the threshold by a notification of the number of UEs 10 performing D2D communications from an upper-level device for the radio base station 310.

In the present embodiment, it is assumed that the radio base station 310 determines that the number of UEs 10 performing D2D communications exceeds the threshold.

The number of UEs 10 performing D2D communications may be the number of terminals actually performing D2D communications or the number of groups performing D2D communications.

In step 260A, the radio base station 310 transmits second switch requests to the UE 10A and the UE 10B. The UE 10A and the UE 10B receives the second switch requests.

The second switch request is one of: a signal requesting the switch of assignment mode from the second assignment mode to the first assignment mode; and a signal indicating that the number of UEs 10 performing D2D communications exceeds the threshold.

The second switch request may be transmitted only to a UE 10 assigning radio resources in D2D communications.

In step 270A, the UE 10A and the UE 10B transmits a response (second switch request response) for the second switch request to the radio base station 310.

Step 280A to step 300A correspond to step 80A to step 100A of FIG. 11 of the first embodiment.

The radio base station 310 may transmit the first switch request described in the second embodiments to the UE 10A and the UE 10B when it is determined that the number of UEs 10 performing D2D communications becomes less than or equal to the threshold. Thus, when the number of UEs 10 performing D2D communications is less than or equal to the threshold, the mobile communication system 100 is operated with the first assignment mode.

This threshold may be equal to the threshold in step 250, or less than the threshold in step 250.

(Operation and Effect)

In the mobile communication system 100 according to the third embodiment, when the number of UEs 10 performing D2D communications exceeds a threshold, an assignment mode is switched from the second assignment mode to first assignment mode. Thus, the processing load of the radio base station 310 is reduced. Furthermore, the flexibility for assignment of radio resources used for user data communications according to D2D communications is improved.

Other Embodiments

The present invention is explained through the above embodiment, but it must not be assumed that this invention is limited by the statements and the drawings constituting a part of this disclosure. From this disclosure, various alternative embodiments, examples, and operational technologies will become apparent to those skilled in the art.

The embodiment has described the case in which two UEs 10 communicate with each other in the D2D communication. However, the embodiment is not limited thereto. Specifically, in the D2D communication, three or more UEs 10 may communicate with one another.

In the embodiment, the UE 10 (the UE 10A or the UE 10B) determines a change in the communication state of the user data directly performed between the UE 10A and the UE 10B. However, the embodiment is not limited thereto.

Specifically, the radio base station 310 may determine the change in the communication state of the user data directly performed between the UE 10A and the UE 10B.

In such a case, on the basis of the D2D control signal received from the UE 10 (the UE 10A or the UE 10B), the radio base station 310 determines the change in the communication state of the user data directly performed between the UE 10A and the UE 10B. The D2D control signal is a signal indicating the transmission power used for the user-data communication or a signal indicating the modulation coding scheme used for the user-data communication.

In the embodiment, the change in the communication state of the user data directly performed between the UE 10A and the UE 10B is mainly determined on the basis of the transmission power used in the user-data communication or the modulation coding scheme used in the user-data communication. However, the embodiment is not limited thereto. The change in the communication state of the user data directly performed between the UE 10A and the UE 10B may be determined on the basis of at least one of: a block error rate; a packet error rate; whether QoS is satisfied; CQI; and a processing load of the UE 10A.

For example, in the case in which the UE 10 (the UE 10A or the UE 10B) determines the change in the communication state of the user data, the D2D control signal is at least one of: a signal indicating that a block error rate related to the D2D communication exceeds a threshold value; a signal indicating that the block error rate related to the D2D communication is below a threshold value; a signal indicating that a packet error rate related to the D2D communication exceeds a threshold value, a signal indicating that the packet error rate related to the D2D communication is below a threshold value; a signal indicating whether predetermined QoS related to the D2D communication is satisfied, a signal indicating that CQI related to the D2D communication is below a threshold value; a signal indicating that the CQI related to the D2D communication exceeds a threshold value; a signal indicating that a processing load of the UE 10 exceeds a threshold value, and a signal indicating that the processing load of the UE 10 is below a threshold value.

Alternatively, in the case in which the radio base station 310 determines the change in the communication state of the user data, the D2D control signal is at least one of: a signal indicating the block error rate related to the D2D communication; a signal indicating the packet error rate related to the D2D communication; a signal indicating the CQI related to the D2D communication; and a signal indicating the processing load of the UE 10.

In the embodiment, an entity that switches between the first assignment mode and the second assignment mode is mainly the UE 10 (the UE 10A or the UE 10B). However, the embodiment is not limited thereto. For example, the entity that switches between the first assignment mode and the second assignment mode may be the radio base station 310. In such a case, the radio base station 310 transmits a signal for requesting the switching between the first assignment mode and the second assignment mode to the UE 10 (the UE 10A or the UE 10B).

Particularly not mentioned in the embodiment, it is possible to provide a program for causing a computer to execute each process performed by the UE 10 (the UE 10A or the UE 10B). Furthermore, the program may be recorded on a computer-readable medium. By using the computer-readable medium, it is possible to install the program in a computer. Furthermore, the computer-readable medium recording the program thereon may include a non-transitory recording medium. The non-transitory recording medium is not particularly limited. For example, the non-transitory recording medium may include a recording medium such as CD-ROM or DVD-ROM.

Alternatively, it is also possible to provide a chip configured by a memory for storing a program for performing each process performed by the UE 10 (the UE 10A or the UE 10B), and a processor for executing the program stored in the memory.

In aforementioned second embodiment, instead of the radio base station 310, an upper-level device than the radio base station 310 may perform an interference determination. That is, a network side may perform the interference determination. In aforementioned third embodiment, instead of the radio base station 310, an upper-level device than the radio base station 310 may determine whether the number of UEs 10 performing D2D communications exceeds the threshold. In this case, the upper-level device notifies, to the radio base station 310, that the number of UEs 10 performing D2D communications exceeds the threshold. Then, the radio base station 310 transmits the second switch requests to the UE 10A and the UE 10B.

In aforementioned first to third embodiments, after the radio base station 310 assigns radio resources to the UE 10A and the UE 10B, the UE 10B receives user data and transmits the transmission acknowledgement signal. However, another way may be applicable. That is, the UE 10B may transmit the transmission acknowledgement signal to another node (e.g. UE 10A), instead of transmitting to a node assigning radio resources (e.g. radio base station 310). For example, in step 80 of the first embodiment, the radio base station 310 notifies semi-statically assigned radio resources (radio resources in which the UE 10A and UE 10B may freely select among radio resources assigned by the radio base station 310). In this case, the UE 10B may transmit the transmission acknowledgement signal to the UE 10 A, instead of transmitting the transmission acknowledgement signal to the radio base station 310.

In aforementioned first to third embodiments, the UE 10B receives user data transmitted from the UE 10A using radio resources assigned by the UE 10B, and transmits the transmission acknowledgement signal indicating whether the user data can be received, to UE 10A. However, another way may be applicable. That is, the UE 10B may transmit the transmission acknowledgement signal to another node (e.g. radio base station 310), instead of transmitting to a node assigning radio resources (e.g. UE 10A). For example, in step 20 of the first embodiment, the UE 10B notifies semi-statically assigned radio resources to the UE 10A. In this case, the UE 10B may transmit the transmission acknowledgement signal to the radio base station 310, instead of transmitting the transmission acknowledgement signal to the UE 10A.

The aforementioned first embodiment to third embodiment may be combined. For example, by combining the second embodiment and the third embodiment, the first switch request and the second switch request may controls the switch between the first assignment mode and the second assignment mode. A selection based on the characteristics of an area, to which the radio base station 310 is provided, may be applicable. Specifically, in business districts in which many UE 10 may perform D2D communications, the mobile communication system according to the second embodiment may be applied. In suburbs business district in which many UE 10 may not perform D2D communications, the mobile communication system according to the third embodiment may be applied. Furthermore, a selection among the first embodiment to the third embodiment based on time zones (e.g. daytime or night time) may be applicable.

In addition, the entire content of U.S. Provisional Application No. 61/664,939 (filed on Jun. 27, 2012) is incorporated herein by reference.

INDUSTRIAL APPLICABILITY

As described above, the mobile communication system and the mobile communication method is useful in mobile communication fields because it is possible to properly assign radio resources to a transmission-side terminal and a reception-side terminal.

The invention claimed is:

1. A mobile communication system comprising:
   a radio base station;
   a plurality of radio terminals perform direct device-to-device (D2D) communication by using radio resources for the D2D communication;
   wherein the plurality of radio terminals include a transmission-side terminal that transmits user data, and a reception-side terminal that receives user data, and wherein the radio resources is part of uplink radio resources for communication between the plurality of radio terminals and the radio base station;
   the radio base station switches between a first assignment mode in which the transmission-side terminal or the reception-side terminal assigns a radio resource used for the D2D communication, and a second assignment mode in which the radio base station assigns the radio resource used for the D2D communication; and
   determining, by the radio base station, a number of radio terminals performing the D2D communication by the second assignment mode;
   determining, by the radio base station, whether the number of radio terminals exceeds a threshold; and
   switching, by the radio base station, the D2D communication from the second assignment mode to the first assignment mode in response to determining that the number of radio terminals exceeds the threshold.

2. A mobile communication method, the mobile communication method comprises:
   directly performing, by a plurality of radio terminals, device-to-device (D2D) communication by using radio resources for the D2D communication;
   wherein the plurality of radio terminals include a transmission-side terminal that transmits user data and a reception-side terminal that receives user data, and wherein the radio resources is part of uplink radio resources for communication between the plurality of radio terminals and a radio base station;
   switching, by the radio base station, between a first assignment mode in which the transmission-side terminal assigns a radio resource used for the D2D communication, and a second assignment mode in which the radio base station assigns the radio resource used for the D2D communication; and
   determining, by the radio base station, a number of radio terminals performing the D2D communication by the second assignment mode;
   determining, by the radio base station, whether the number of radio terminals exceeds a threshold; and
   switching, by the radio base station, the D2D communication from the second assignment mode to the first assignment mode in response to determining that the number of radio terminals exceeds the threshold.

* * * * *